United States Patent Office 3,265,614
Patented August 9, 1966

3,265,614
REMOVAL OF SULFUR BODIES
Wallace R. Matthew, Kirkwood, Mo., assignor to Petrolite Corporation, Wilmington, Del., a corporation of Delaware
No drawing. Filed Jan. 13, 1964, Ser. No. 337,128
8 Claims. (Cl. 208—222)

This invention relates to a process of removing residual sulfur bodies from hydrocarbon streams. More particularly this invention relates to a process of removing from hydrocarbon streams those residual sulfur bodies which are not susceptible to removal by treatment with acids, such as sulfuric acid, bases such as caustic, or water.

Hydrocarbon oils, such as for example those obtained by the fractional distillation of petroleum, often are contaminated with impurities which are susceptible of removal by sulfuric acid. Such impurities include sulfur bodies, nitrogenous bodies, unsaturated compounds, etc. These impurities are readily removed or reduced by treatment with sulfuric acid. When the sulfuric acid treatment is completed and the sulfuric acid is separated therefrom by any suitable means (such as by gravity, centrifugation, electrostatic treatment, etc.), the sulfuric acid treated hydrocarbon is then treated with caustic to remove sulfuric acid and other residual acid bodies remaining in the hydrocarbon. After the caustic phase is separated from the hydrocarbon by any suitable means (gravity, centrifugation, electrostatics, etc.) the hydrocarbon is water washed to remove caustic and other residual water soluble impurities present in the oil and separation is thereupon effected by any suitable means, such as in the prior steps. Although sulfuric acid removes many impurities from the hydrocarbon oil, it also reacts with the hydrocarbon to form certain sulfur bodies which cannot be removed by treatment with sulfuric acid, caustic, or water during conventional hydrocarbon processing.

Although I do not wish to be bound by theoretical considerations, it is believed that certain constituents of the hydrocarbon react with sulfuric acid to form anhydrides. For example, when the hydrocarbon is treated with sulfuric acid the following type compounds may be formed, where the R's (which may be the same or different) are derived from the hydrocarbon,

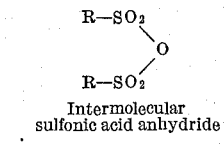
Intermolecular sulfonic acid anhydride

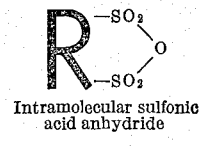
Intramolecular sulfonic acid anhydride

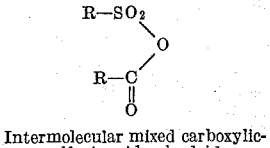
Intermolecular mixed carboxylic-sulfonic acid anhydride

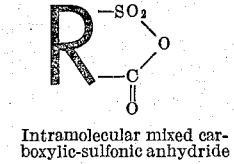
Intramolecular mixed carboxylic-sulfonic anhydride

These anhydrides which are formed on treatment with $H_2SO_4$ are not only extremely soluble in the hydrocarbon but are not susceptible of removal by either sulfuric acid, caustic or water.

Hydrocarbon contaminated by the presence of even small proportions of sulfur-containing compounds have proven extremely difficult to handle in chemical processes occurring at elevated temperatures. The equipment used to conduct such high temperature processes undergoes rapid and severe corrosion and deterioration leading to high costs of maintenance and replacement. It is believed that in subjecting such hydrocarbons to increased temperatures these fulfur bodies are decomposed into acidic materials which foul and corrode the process equipment.

In addition, it is essential that hydrocarbons which are subjected to certain catalysts be substantially free of sulfur because the presence of sulfur in the hydrocarbon tends to deteriorate the catalyst. For example, desulfurization of hydrocarbon feedstocks is a necessary step in the manufacture of methanol from a mixture of carbon monoxide and hydrogen produced by steam reforming of a straight run naphtha. In this process of steam reforming it is essential that the naphtha be substantially free from sulfur because even minor amounts of sulfur tend to deteriorate rapidly the catalyst used therein under normal commercial conditions.

In addition, when hydrocarbons such as naphtha are upgraded by treatment with certain catalysts such as platinum, palladium, etc., for example, in the preparation of a platformate gasoline, it is highly desirable to remove certain bodies, such as those containing sulfur, nitrogen, metals, etc., from the hydrocarbon stream since their presence therein tends to deteriorate or poison the catalyst.

I have now discovered that although treatments with sulfuric acid, caustic, and water are capable of removing various impurities from a hydrocarbon, during this treatment certain sulfur-bodies are formed in the hydrocarbon during treatment with sulfuric acid and remain in the hydrocarbon during the entire process. These sulfur bodies are neutral, hydrocarbon-soluble, water-insoluble compounds which remain in the oil as contrasted to being extracted therefrom. Moreover, they tend to decompose during hydrocarbon possessing and cause fouling, corrosion, catalyst poisoning, and the like.

I have further discovered that these sulfur-bodies in hydrocarbons formed on treatment with sulfuric acid can be removed by contacting these hydrocarbons with those amines which are capable of converting said sulfuric bodies such as the sulfonic anhydrides into water or base-soluble compounds which can be readily removed from the hydrocarbon.

Although I do not wish to be bound by theoretical considerations, it is believed that the anhydrides are removed according to the following equations:

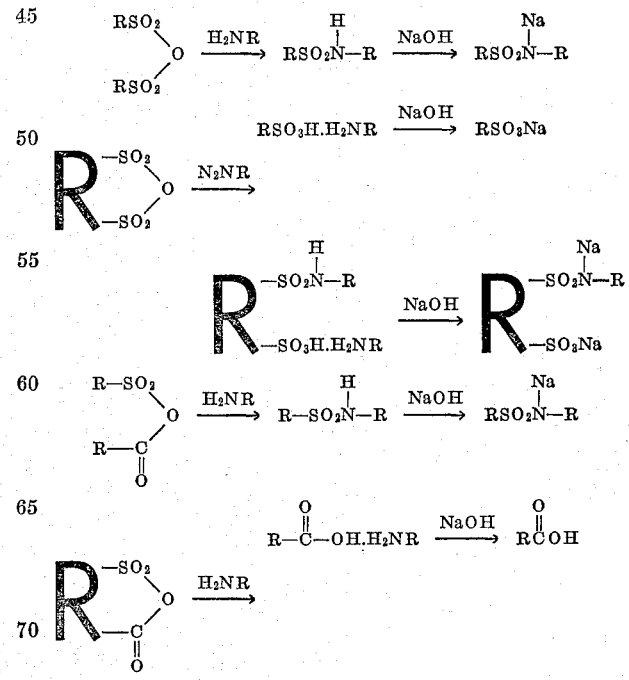

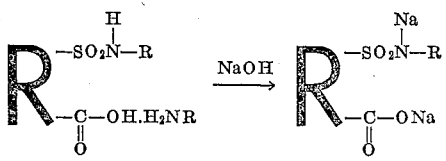

Since these reactions take place at ambient temperatures and yield products which are soluble in caustic and/or water, they can be readily removed from the hydrocarbon oil.

Any amine capable of reacting with the anhydride to produce a water soluble product or a product which can be rendered water soluble can be employed. In practice it is desirable to employ a water soluble amine, preferably one which is soluble in an aqueous caustic solution. Although it is convenient to treat the hydrocarbon oil with an aqueous caustic solution containing the amine, the amine treatment can also precede or follow the caustic treatment provided that in following the caustic treatment there are sufficient cations, such as sodium ions, in the water wash as to form water soluble anhydride-amine reaction products.

Since the sulfonic anhydrides are generally present in the hydrocarbon oil in trace amounts, sufficient amine should be present so as to stoichiometrically react with the sulfonic anhydride present in the oil. In normal operations in the caustic solution I generally add at least about 0.01% w./v. of amine, for example from about 0.01% to 50% w./v. or more such as from about 1 to 25% but preferably from about 10 to 20%. This caustic-amine treatment generally takes place at ambient temperatures, but higher or lower temperatures can be employed, for example from 0° C. or lower to 100° C. or higher, depending on certain features of the system, for example the boiling point of the hydrocarbon, the decomposition temperature of the amine, the reaction products, etc.

In the preferred embodiment, it is desirable to react the sulfonic anhydride with an amine capable of reacting with the anhydride so as to have an acidic hydrogen bound to the nitrogen group unless the amine has another group present in the product which has another salt forming group such as a carboxylic acid group, a sulfonic acid group, a phenolic group, etc.

Thus, it is preferred to react the anhydride with an amine having a primary amino group such as to form a

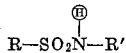

group where the encircled hydrogen is acidic enough to form a salt,

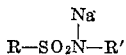

However, in certain instances a secondary amine may be employed where the product itself (without the formation of a salt), is soluble enough to be extracted with water or an aqueous solution. In certain instances these non-salt forming sulfonamide products tend to align themselves at the hydrocarbon-water interphase and therefore are more difficult to remove than the salt forming products which are readily extracted with water or dilute bases. Where a polyamine is employed and the products do not contain acidic but only basic groups, this product may be removed by washing with an aqueous acid. For example, where the sulfonic anhydride is re-reacted with a polyalkylene polyamine to form the following type product.

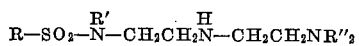

this product contains basic groups which can be extracted with an acid, such as HCl, H₂SO₄, acetic, etc. acids, by the formation of soluble salts. Thus, with H₂SO₄ the following salt can be formed

and extracted from the hydrocarbon.

A wide variety of amines can be employed, including aliphatic, cycloaliphatic, aromatic, heterocyclic, etc., mono- and polyamines; and amines having one or more of the above groups. These amines include aliphatic amines such as

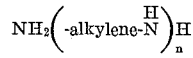

for example ethylene diamine, diethylene triamine, triethylene tetramine, tetraethylenepentamine, propylene diamine, dipropylenetriamine, tripropylenetetramine, butylenediamine, etc.; substituted derivatives thereof, such as where for example the nitrogen-bonded hydrogens are alkyl groups, provided such amines are capable of forming sulfonamide which are or can be rendered water soluble; hydroxyl amine derivatives such as hydroxyalkyl amines; corresponding monoamines of the formula $RNH_2$ where R is a hydrocarbon group such as alkyl, substituted derivatives thereof such as where the nitrogen-bonded hydrocarbon is alkyl, hydroxyalkyl, etc.; cycloaliphatic amines such as cyclohexyl amine, substituted cyclohexyl amines, etc., arylamines such as N-hydroxyalkyl phenylamines, etc.; heterocyclic amines such as morpholine, pyridine, piperidine, etc.; amphoteric compounds such as for example amino acids of the formula

such as glycine, analogous thereof, etc.,

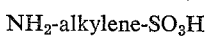

for example amino ethyl sulfonic acid; sulfamic acid, etc.

As is quite evident, many types of amines are useful in this invention. It is, therefore, not only impossible to attempt to a comprehensive catalogue of such compositions, but to attempt to describe the invention in its broader aspects in terms of specific chemical names of amines would be too voluminous and unnecessary since one skilled in the art could in view of the present specification select a suitable amine. This invention lies in employing amines capable of reacting with sulfonic anhydrides so as to produce products which form water soluble products or which can be converted to water soluble products. Their individual composition is important only in the sense that the properties of the amine can effect this function. To precisely define each specific useful amine in light of the present disclosure would merely call for knowledge within the skill of the art in a manner analogous to a mechanical engineer who prescribes in the construction of a machine the proper materials and the proper dimensions thereof. From the description in this specification and with the knowledge of a chemist, one will know or deduce with confidence those amines suitable for this invention by means of the criteria set forth therein. In analogy to the case of a machine wherein the use of certain materials of construction or dimensions of parts would lead to no practical useful result, various materials will be rejected as inapplicable where others would be operative. One can obviously assume that no one will wish to employ a useless amine or will be misled because it is possible to misapply the teachings of the present disclosure in order to do so. Thus, any amine that can perform the function stated herein can be employed.

The amine is employed on a percent w./v. basis, i.e. weight of amine/volume of caustic solution.

The following is a flow diagram of a preferred embodiment of the invention wherein electrostatic separations are employed.

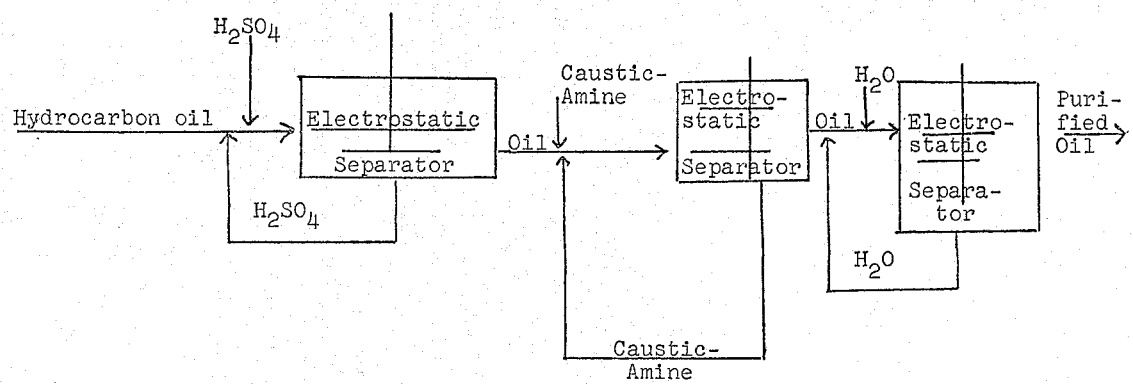

Although recycling is shown in the above diagram, it should be realized that recycling is optional.

Acid treatment of hydrocarbon streams involves the use of strong mineral acids in concentrated form, such as sulfuric acid in the range of about 80% but preferably 88% to the oleums. The amount of acid used is usually varied to suit the degree of refinement required for the particular oil stock being treated. After injecting the acid into the oil it is necessary to provide a mixing means which intensely emulsifies the acid and oil to form finely dispersed droplets of acid in the oil. By so doing, rapid reaction between the two phases is possible, and whatever chemical and/or physical solution changes are involved can quickly take place. In this way it is possible to mix the oil with the acid just prior to subjecting it to the electric treating field, thereby desirably minimizing the time of contact between the acid and the oil and obtaining superior oil quality as well as avoiding an aging effect on the sludge while in intimate contact with the oil. It has been found that extended oil-sludge contact tends to degrade the oil and to cause the sludge to become more viscous and of less economic value. If intense mixing is used in conventional settling processes, extended time periods are required to obtain any remotely satisfactory separations, thereby increasing the cost of the process in addition to degrading the products.

A satisfactory method of obtaining intense emulsification of the acid with the oil is to pass the preliminary mixture, obtained by continuously injecting the acid into the oil stream, through a motor-driven centrifugal pump which is throttled to increase the internal turbulence, or which is inverted so that the mixture is forced into its discharge and flows out through its suction. Such intense mixing permits rapid and efficient contact of the acid with the oil and is followed by the prompt action of the electric field in again separating the phases.

In the case of treatment of oils with the alkaline-amine solution, the alkali most commonly used is caustic soda, but others of equivalent chemical effect, such as caustic potash, may be used. Alkaline as employed herein relates to caustic soda or its equivalent. I prefer to use aqueous solutions of concentrations in the range of about 0.2 to 2 N or higher, and more particularly about 0.5 N to 1 N, in order to avoid the formation of "inverse phase" emulsions, or sludges, which occur when more dilute solutions are used, and the tendency for soaps to be "salted out" into the oil with the more concentrated solutions.

In order to obtain the most efficient use of the alkaline-amine solution in reacting with the oil constituents, it is necessary that intimate contact be made between the two phases. However, the mixing of the alkaline-amine systems can usually not be so violent as the acid mixtures described above, because of the formation of "inverse phase," i.e., oil-in-water type of systems, which are not amenable to treatment by the electric fields. I have found that intimate contact is obtainable without adverse effects if the alkaline-amine solution is sprayed into the flowing oil stream by means of a distributor providing a narrow opening of considerable length, as by the injector apparatus to be described. Centrifugal pumps usually cause treating difficulties and are therefore not desirable. Due to the high coalescing effectiveness of my process, intimate contact between the alkali and oil can be utilized, such as by an injector means, thereby making it possible to use only the amount of caustic required to complete reaction with the desired oil constituents. In older processes where more gentle agitation had to be used in order to obtain reasonably good separation of the phases, an excess of caustic was required, and this in turn made the process not only more costly but tended to degrade the oil by a "salting out" effect on the soaps from the aqueous solution. Adequate emulsification may also be obtained by the use of multiple baffle mixers. Because of the rapid treatment possible with my process, aging effects due to extensive or prolonged contact between the phases are practically eliminated.

When the emulsions of acid or alkali with the oil have been properly prepared as described above, they are promptly introduced into an electric treater, being therein subjected to electrostatic treatment. Suitable examples of electric treaters suitable in this invention are described in U.S. Patents 2,855,357, 2,855,360, 2,976,228, etc. and elsewhere. These types of treaters are well known to the art.

Aqueous washes are carried out in the conventional manner preferably followed by electrostatic treatment.

THE ANIONIC SURFACE ACTIVE TEST

To detect the presence of anionic surface active material in the acid treated hydrocarbon stream the following procedure may be used. This test detects the presence of the anionic surface active materials produced by the decompositions of the sulfonic anhydrides.

A 1.0 liter sample of the hydrocarbon is intimately mixed with 10–15 ml. of 0.1 N NaOH by the piston and cylinder method or by shaking in a separating funnel and the aqueous caustic phase separated and neutralized with HCl of comparable strength.

To this neutralized solution is added 25 ml. of methylene blue solution [1] and 10 ml. of chloroform, the phases are mixed by gentle shaking and the $CHCl_3$ allowed to separate.

The intensity of the blue color in the $CHCl_3$ phase is directly proportional to the contents of the anionic active material originally present in the hydrocarbon.

The following examples are presented for purposes of illustration and not of limitation.

Example 1

A straight-run naphtha containing about 200 p.p.m. of sulfur was (1) treated with spent alkylation sulfuric

---

[1] The solution follows:
Methylene blue hydrochloride _____ mg__ 30
Conc. $H_2SO_4$ _____ ml__ 6.7
$Na_2SO_4$ (anhyd.) _____ grams__ 50
Dil. to liter with $H_2O$.

acid (10 lb. H₂SO₄/barrel of naphtha) and then electrically treated to separate the acid therefrom, (2) treated with 15° Bé. aqueous caustic, electrically treated to separate the caustic therefrom; and (3) water washed, and then electrically treated to separate the water therefrom.

The resulting hydrocarbon product yielded a definite carbonaceous residue on distillation, produced a positive anionic surface active test, and decomposed on standing for 1 day to yield an acidic product.

The above example was repeated except that the caustic phase employed contained 10% w./v. of ethanolamine to caustic solution. The resulting hydrocarbon yielded no carbonaceous residue, produced a negative anionic surface active test and remained neutral on standing indefinitely.

*Example 2*

Comparable runs (as in Example 1) were also carried out employing ethylenediamine. As compared to the run employing sulfuric acid, caustic, and water washes, the corresponding run employing 10% w./v. ethylenediamine in caustic yielded no carbonaceous residue on distillation, produced a negative anionic surface active test and remained neutral on standing indefinitely.

*Example 3*

Similar results were obtained employing sulfamic acid, 10% w./v. in the caustic solution. The hydrocarbon product reacted with sulfuric acid, caustic containing sulfamic acid, and water wash yielded no carbonaceous residue on distillation, produced a negative anionic surface active test and did not become acidic on standing definitely.

*Example 4*

The efficiency which amines reduce the sulfonic anhydride content of a hydrocarbon such as iso-octane is demonstrated by the following:

A stock iso-octane solution of dodecylbenzene sulfonic anhydride was prepared such that a 1.0 ml. aliquot, when diluted to 50 ml. with the same solvent, gave a maximum absorbence of 0.99 when examined in the ultra-violet region of the electromagnetic spectrum. 100 ml. aliquots of the stock solution were treated with 10% by volume of 1.0 N NaOH containing 10% w./v. of the various amine compounds (based on the caustic solution volume). After separation of the phases the hydrocarbon was H₂O washed wtih 10% by vol. and the phases separated. U.V. examination of the treated hydrocarbon indicated the following percent anhydride removal.

| Amine compound: | Percent anhydride removal |
|---|---|
| Ethylene diamine | 98 |
| 2-amino ethanol | 96 |
| Sulfamic acid | 98 |

Hydrocarbon products obtained by treatment according to this invention exhibit little, if any, fouling and corrosion in distillation, do not poison sulfur sensitive catalysts such as platinum, palladium, etc., yield products which are superior as fuels to the untreated hydrocarbon since they contain little, if any, sulfur.

While the invention has been described herein with particular reference to various preferred embodiments thereof, it will be appreciated that variations from the details given herein can be effected without departing from the invention in its broadest aspects.

Having thus described my invention what I claim as new and desire to obtain by Letters Patent is:

1. A process of removing sulfur bodies from a sulfuric acid treated hydrocarbon characterized by treating said hydrocarbon after the sulfuric acid treatment with an organic amine capable of reacting with a sulfonic anhydride, thereby yielding a product capable of aqueous extraction from said hydrocarbon, and separating said hydrocarbon therefrom.

2. The process of claim 1 wherein the separation of the hydrocarbon is effected electrostatically.

3. A process of removing sulfur bodies from a sulfuric acid treated hydrocarbon characterized by treating said hydrocarbon after the sulfuric acid treatment with an alkaline-organic amine solution, said amine being capable of reacting with a sulfonic anhydride, thereby yielding a product capable of aqueous extraction from said hydrocarbon, and separating said hydrocarbon therefrom.

4. The process of claim 3 where separation of the hydrocarbon is effected electrostatically.

5. The process of purifying a hydrocarbon comprising (1) treating said hydrocarbon with sulfuric acid, thereby forming a sulfuric acid treated hydrocarbon-sulfuric acid mixture, (2) separating said sulfuric acid treated hydrocarbon from said mixture, thereby obtaining hydrocarbon containing residual sulfur bodies, (3) treating said sulfuric acid treated hydrocarbon containing residual sulfur bodies with an aqueous alkaline-organic amine solution, said organic amine being capable of reacting with a sulfonic anhydride, thereby forming a mixture containing said alkaline-organic amine treated hydrocarbon and a product capable of aqueous extraction from said hydrocarbon, and (4) separating said hydrocarbon from said mixture.

6. The process of claim 5 wherein said mixture containing a product capable of aqueous extraction from said hydrocarbon is subjected to a water wash prior to the step of separating said hydrocarbon from said mixture.

7. The process of claim 5 wherein said sulfuric acid treated hydrocarbon and said alkaline-organic amine treated hydrocarbon are separated from their respective mixtures electrostatically.

8. The process of claim 6 wherein said sulfuric acid treated hydrocarbon and said alkaline-organic amine treated hydrocarbon are separated from their respective mixtures electrostatically.

References Cited by the Examiner

UNITED STATES PATENTS

| 2,106,976 | 2/1938 | Harris et al. | 208—273 |
| 2,187,883 | 1/1940 | Lemmon | 208—273 |
| 2,247,926 | 7/1941 | Smith | 208—224 |
| 2,247,927 | 7/1941 | Smith | 208—224 |

DELBERT E. GANTZ, *Primary Examiner.*

S. P. JONES, *Assistant Examiner.*